United States Patent [19]
Nakanishi

[11] Patent Number: 5,313,132
[45] Date of Patent: May 17, 1994

[54] ELASTIC SUPPORTING MEMBER FOR A VIBRATION DRIVEN MOTOR

[75] Inventor: Tohru Nakanishi, Yokohama, Japan

[73] Assignee: Canon Kabushiki Kaisha, Tokyo, Japan

[21] Appl. No.: 884,172

[22] Filed: May 18, 1992

[30] Foreign Application Priority Data

May 20, 1991 [JP] Japan .................. 3-114597

[51] Int. Cl.$^5$ ............................................. H01L 41/08
[52] U.S. Cl. ..................................... 310/348; 310/323
[58] Field of Search ............... 310/321, 323, 334, 348, 310/355

[56] References Cited

U.S. PATENT DOCUMENTS

| | | |
|---|---|---|
| 4,692,651 | 9/1987 | Hiramatsu et al. .................. 310/323 |
| 4,871,937 | 10/1989 | Kawai .................................. 310/323 |
| 4,959,579 | 9/1990 | Kuwabara et al. .................. 310/323 |
| 5,053,669 | 10/1991 | Saeki et al. ........................... 310/323 |
| 5,091,670 | 2/1992 | Kawata et al. ....................... 310/323 |
| 5,107,163 | 4/1992 | Umemura et al. ................... 310/323 |

FOREIGN PATENT DOCUMENTS

| | | |
|---|---|---|
| 0283471 | 11/1988 | Japan .................................. 310/323 |
| 0117671 | 5/1989 | Japan .................................. 310/323 |
| 1303072 | 12/1989 | Japan . |
| 2155480 | 6/1990 | Japan . |
| 0237479 | 9/1990 | Japan .................................. 310/348 |
| 0303372 | 12/1990 | Japan .................................. 310/348 |
| 0303377 | 12/1990 | Japan .................................. 310/348 |

Primary Examiner—Steven L. Stephan
Assistant Examiner—C. LaBalle
Attorney, Agent, or Firm—Fitzpatrick, Cella, Harper & Scinto

[57] ABSTRACT

A vibration driven motor including a vibration member for generating a vibration therein, a rotor arranged in frictional contact with the vibration member and driven by the vibration, a rotary output member, and a connection member connecting the rotor to the output member. The connection member includes a bent portion that is deformed in an axial direction on the rotary output member. In another aspect a connection member having a bent portion may be provided for engaging the vibration member at a predetermined portion. In each case, the bent portion(s) of the connection member absorbs any change in the dimensions thereof, e.g., due to a change in the temperature or other environmental factors.

14 Claims, 11 Drawing Sheets

PRIOR ART

FIG. 8

PRIOR ART

ELASTIC SUPPORTING MEMBER FOR A VIBRATION DRIVEN MOTOR

BACKGROUND OF THE INVENTION

1. Field of the Invention

The present invention relates to a vibration driven motor for driving a movable body and a vibrating body relative to each other by a vibration wave, in particular, by a travelling vibration wave.

2. Related Background Art

Figure 7:
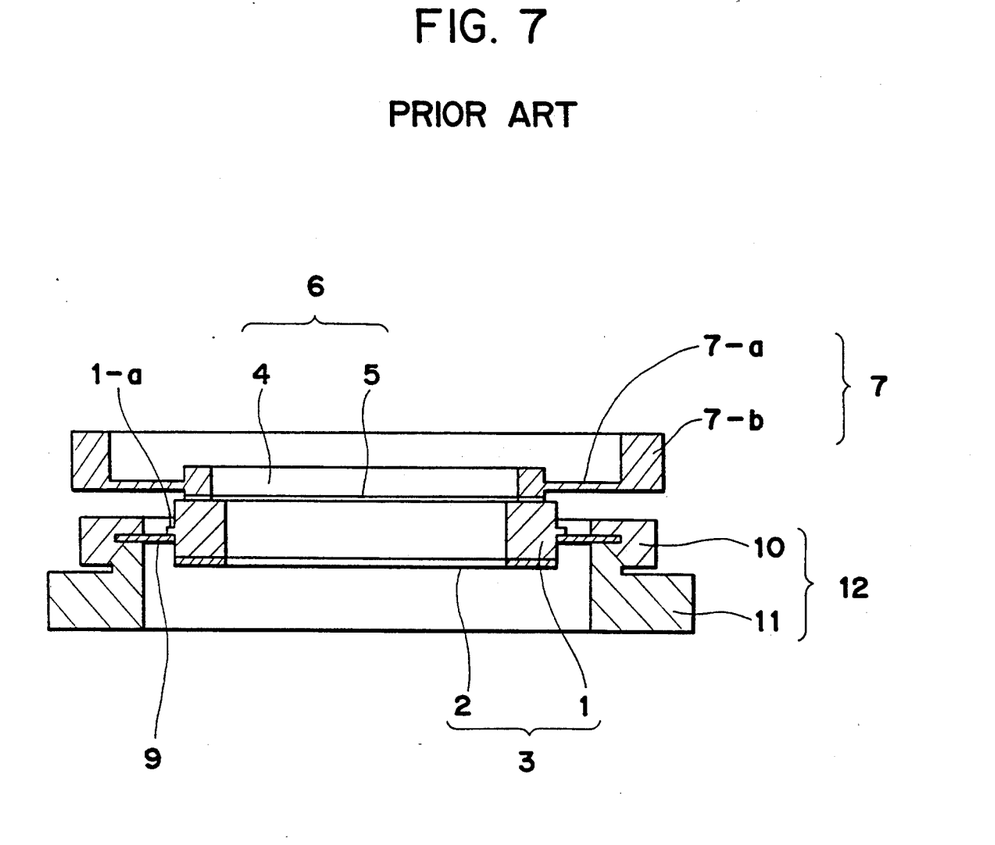
FIG. 7 is a sectional view of a conventional vibration driven motor.

Conventional vibration driven motors have been proposed in Japanese Patent Application Laid-Open Nos. 1-303072, 2-155480, and the like. In a motor of this type, a ring-like rotor 6 or a stator 3 shown in FIG. 7 is supported by a plurality of support elements radially or obliquely projecting from the rotor or stator main body. The conventional motor will be described in detail below with reference to FIG. 7. FIG. 7 is a longitudinal sectional view showing a conventional vibration driven motor, and FIG. 8 is a perspective view thereof.

Figure 8:
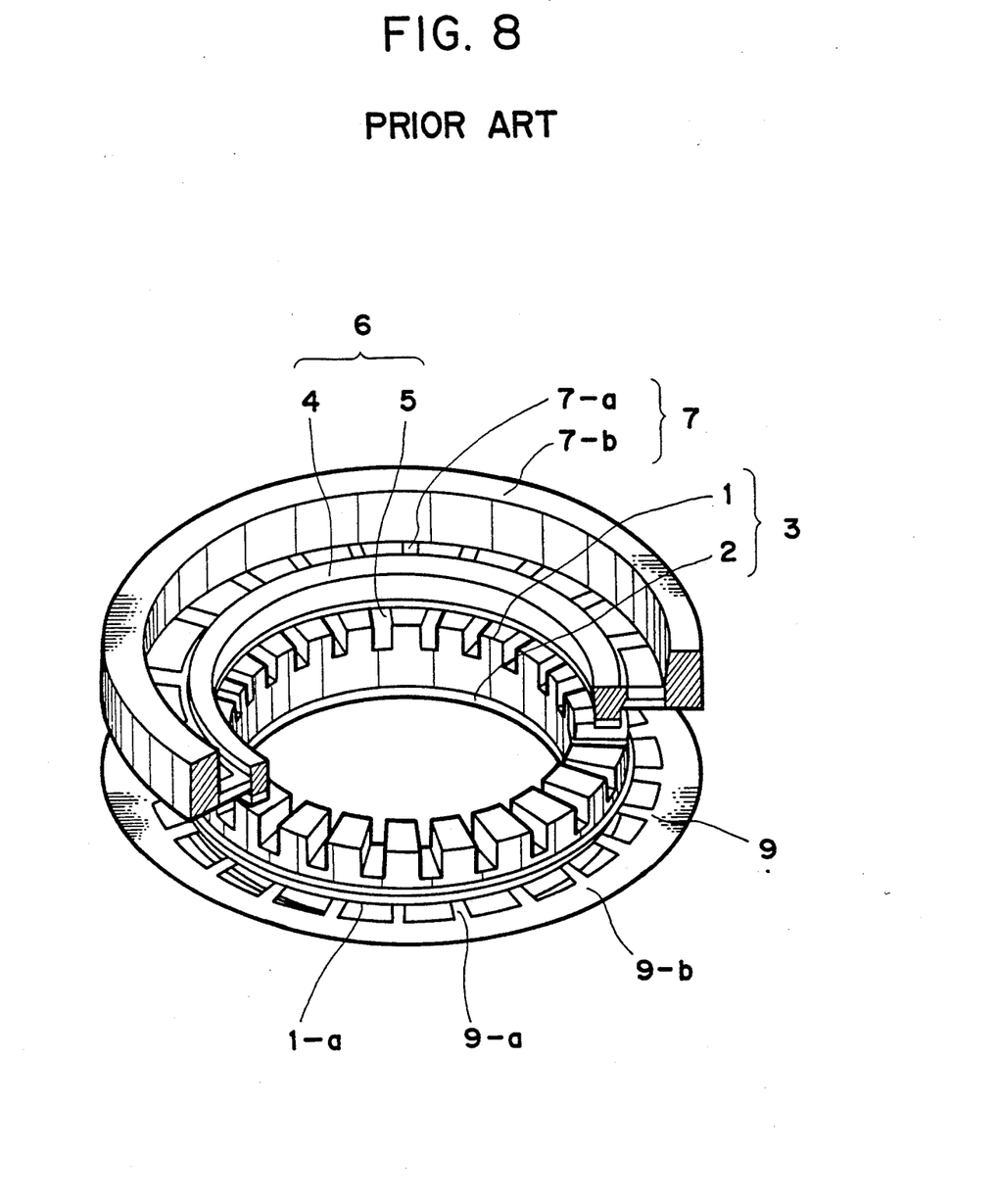
FIG. 8 is a perspective view of the motor shown in FIG. 7.

In FIGS. 7 and 8, an elastic body 1 and a piezo-electric element 2 are adhered integrally with each other to constitute the stator 3. The rotor 6 is constituted by a rotor ring 4 and a slider 5, and contacts the stator 3 under pressure by a compression member (not shown).

A stator support member 9 has an elasticity, and is provided with a plurality of support elements 9-a, which project radially inwardly from a ring-like main body 9-b, and are arranged at equal angular intervals in the circumferential direction.

Figure 9:
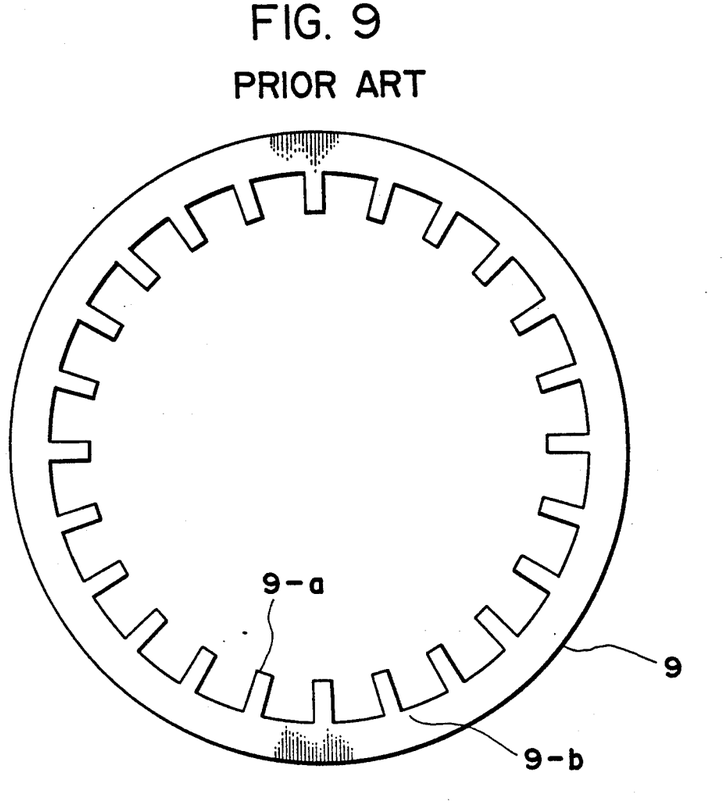
FIG. 9 is a plan view of a support member used in the motor shown in FIG. 7.

FIG. 9 shows the shape of the stator support member. The support elements 9-a are adhered to the lower surface of a flange portion 1-a arranged on the outer peripheral portion of the elastic body 1. The support member 9 is fixed to a fixing member (not shown) by its ring-like main body 9-b.

The rotor 6 is supported by a rotor support member 7 constituted by support elements 7-a integrated with the rotor ring 4, and a rotor support member main body 7-b. The rotor support elements 7-a have an elasticity like in the stator support member 9, and are arranged to extend radially therefrom at equal angular intervals in the circumferential direction.

However, in the conventional vibration driven motor, one end of each stator support element 9-a is integrated with the ring-like main body 9-b fixed to the fixing member (not shown), and the other end thereof is adhered to the flange portion 1-a of the stator 3. For this reason, each stator support element 9-a is restricted in the radial direction. Similarly, one end of each support element 7-(a) of the rotor 6 is integrated with the rotor ring 4, and the other end thereof is supported by the rotor support member 7. Thus, each rotor support element 7-a is also restricted in the radial direction. For this reason, the elastic displacements of the support elements in a direction to bring the rotor 6 and the stator 3 into tight contact with each other cannot be increased either when the support elements project radially, of when the support elements are arranged in an oblique direction. As a result, a pressurizing force between the rotor 6 and the stator 3 can cause a compression nonuniformity as a result of a dimensional precision error or an assembling error in the constituent members, or as a result of pressurizing force changes due to a change in dimensions over time, thus deteriorating motor characteristics.

Figure 10:
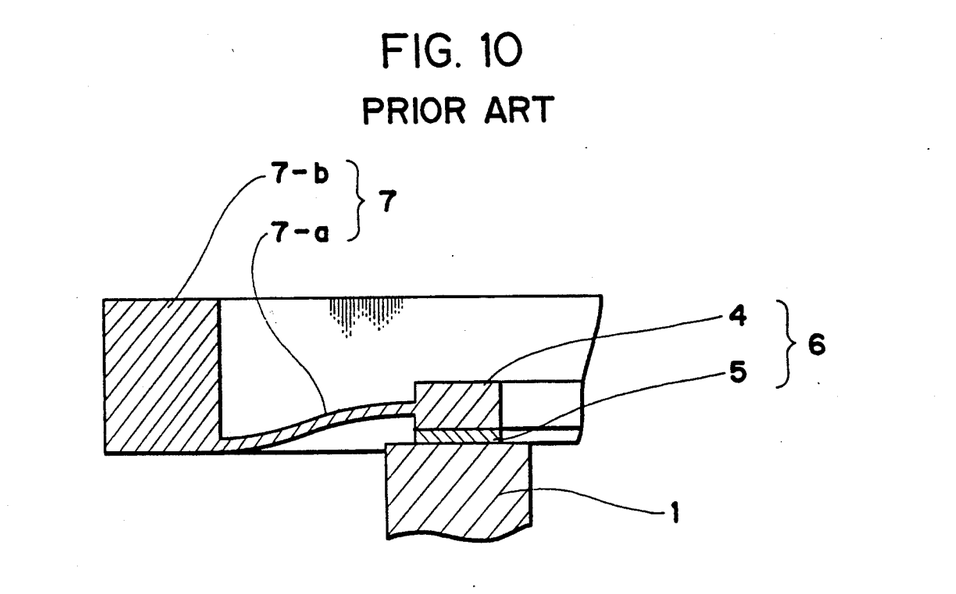
FIG. 10 is a sectional view of a deformed state of a rotor support member shown in FIG. 7.

Furthermore, in a case wherein the support member and other members fixed to the support member have different linear expansion coefficients, or in a case wherein they have the same linear expansion coefficient, when the temperatures of the respective members change or when a temperature gradient is formed among the respective members due to a change in the environmental temperature, a beam deforms as shown in FIG. 10 in a compression state. For this reason, when the support elements 7-a or the support member main body 7-b receives a tension in the longitudinal direction of the beam, a partial force of the pressurizing force of the tension is generated, and the pressurizing force is increased. On the other hand, when the support elements 7-a or the support member main body 7-b receives a compression force in the longitudinal direction, the pressurizing force is decreased. As a result, motor characteristics change inadvertently, and in an extreme case, the adhered portions between the support elements 9-a and stator flange portion 1-a can peel.

SUMMARY OF THE INVENTION

It is an object of the present invention to provide a vibration driven motor which can solve the conventional problems.

According to the present invention, an elastic plate, having an elasticity, for supporting a vibrating body or a driven body contacting the vibrating body has the following arrangement: one end of the elastic plate for the driven body is fixed to an output member, the other end thereof is fixed to the driven body directly or through an intermediate member, and a bent portion is provided in a direction perpendicular to a plane connecting the two fixed portions, so that a radial change in dimension is absorbed by the bent portion. Alternatively, one end of the elastic plate for the vibrating body is fixed to a fixing member, the other end thereof is fixed to the vibrating body, and a bent portion is provided in a direction perpendicular to a plane connecting the two fixed portions, so that a radial change in dimension is absorbed by the bent portion.

Other objects of the present invention will become apparent from the following detailed description of the present invention.

DETAILED DESCRIPTION OF THE PREFERRED EMBODIMENTS

Figure 1:
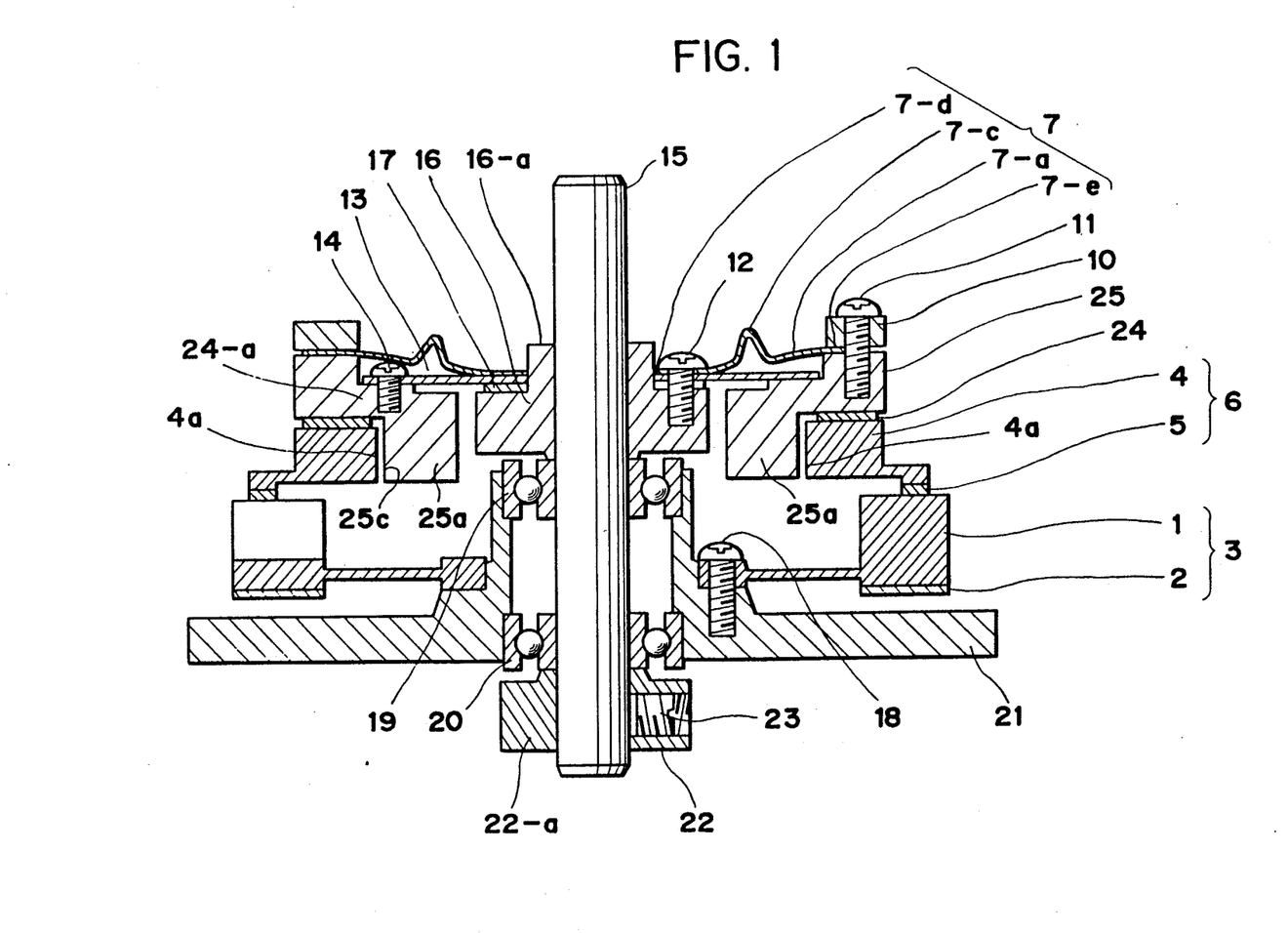
FIG. 1 is a longitudinal sectional view showing an embodiment of a vibration driven motor according to the present invention.
Figure 2:
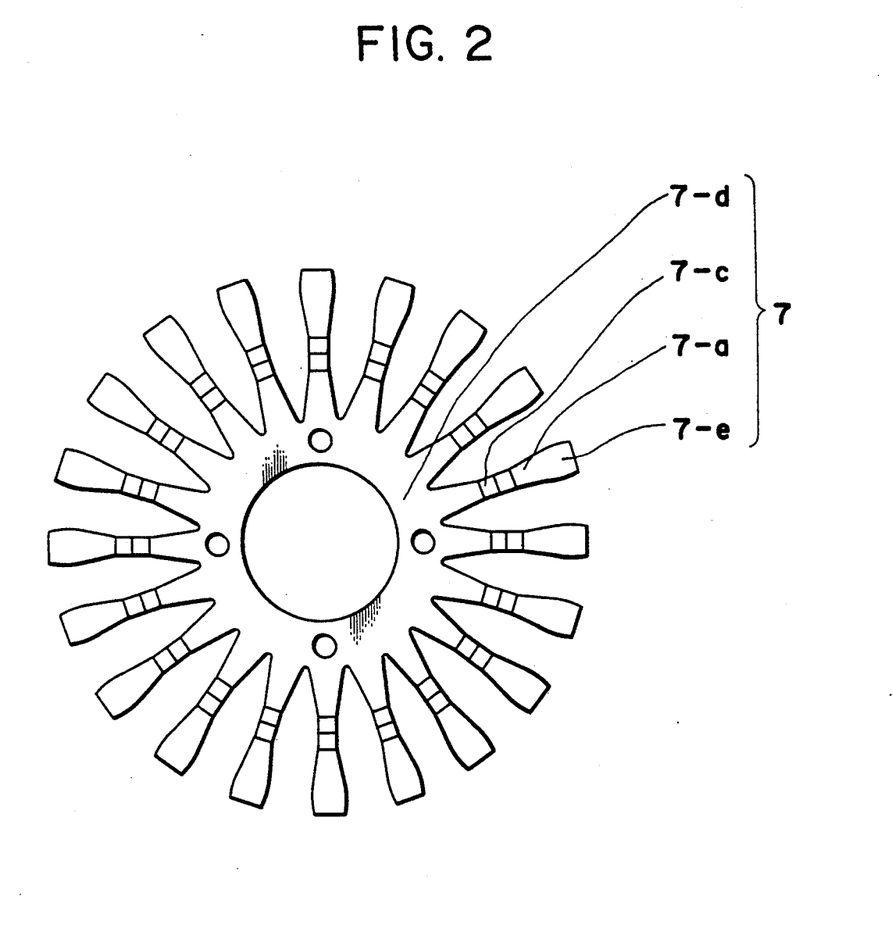
FIG. 2 is a plan view of a pressurizing spring shown in FIG. 1.
Figure 3:
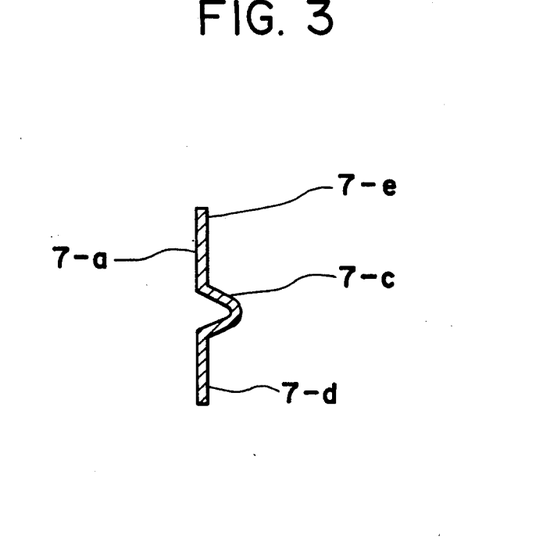
FIG. 3 is a sectional view of the pressurizing spring shown in FIG. 1.
Figure 4:
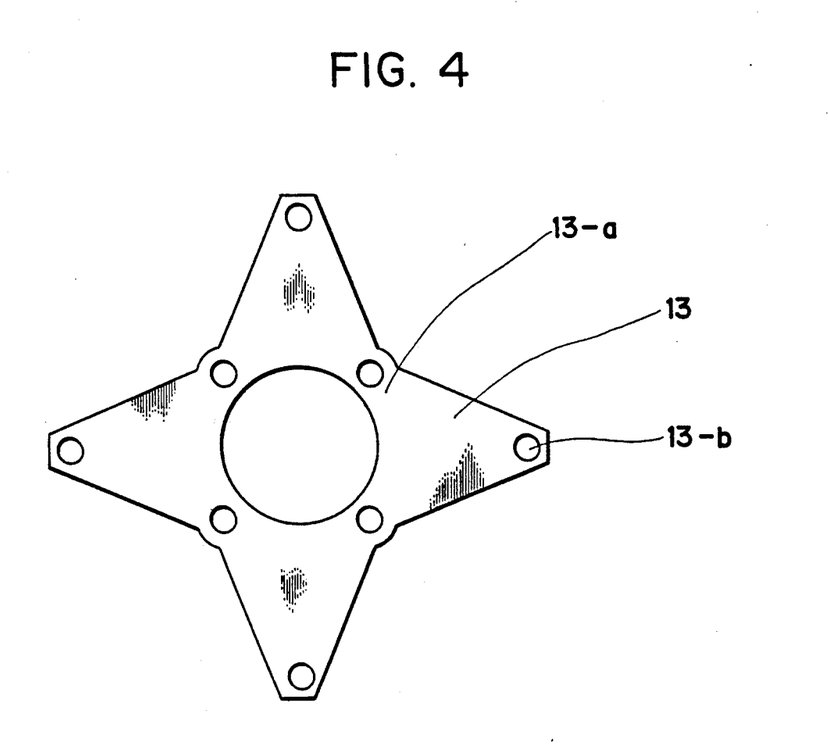
FIG. 4 is a plan view of an elastic flat plate shown in FIG. 1.

FIG. 1 shows a first embodiment of the present invention, and FIGS. 2 to 4 are plan views of an embodiment of an elastic plate and an elastic flat plate shown in FIG. 1 as the characteristic feature of the present invention.

The present invention will be described hereinafter with reference to FIG. 1. Note that the same reference numerals in FIG. 1 denote members having the same functions as those in the prior art, and a detailed description thereof will be omitted.

A piezo-electric element 2 comprising, e.g., PZT, is fixed to a ring-like metal elastic body 1 to constitute a vibrating body (to be referred to as a stator hereinafter) 3. The stator 3 is fixed to a housing 21 by screws 18. A rotor main body 4 as a driven body is driven by a vibration wave generated in the stator 3, and a slider 5 is adhered to the surface of the rotor main body 4. The rotor main body 4 and the slider 5 constitute a rotor 6. An output shaft 15 is rotatably and axially supported by ball bearings 19 and 20 attached to the housing 21. The output shaft 15 is also axially supported by the inner rings of the ball bearings 19 and 20 to be slidable in the vertical direction in FIG. 1. The output shaft 15 applies a proper pressure to an upper surface 16-a of a disc 16 fixed to the output shaft 15, and a lower surface 22-a of a pilot pressure collar 22 to fasten a set screw 23 of the pilot pressure collar 22, thereby applying a pilot pressure to the two ball bearings 19 and 20. A pressurizing spring 7 as an elastic plate has a plurality of beams 7-a radially projecting from a central annular portion 7-d, as shown in FIGS. 2 and 3. The central annular portion 7-d is fixed to the disc 16 by screws 12, and outer peripheral ends 7-e of the beams 7-a are fixed to an intermediate ring 25 by screws 11 together with a fixing ring member 10. Furthermore, the pressurizing spring 7 has at least one bent portion 7-c between the above-mentioned two fixed portions. When the pressurizing spring 7 is attached, it is elastically deformed, as shown in FIG. 1, and urges the rotor 6 against the stator 3 through the intermediate ring 25 and a rubber body 24, although the outer peripheral end portions 7-e of the beams 7-a and the annular portion 7-d are present in the same plane, as shown in the partial sectional view of FIG. 3.

An elastic flat plate 13, the plan view of which is shown in FIG. 4, is not displaced in the pressurizing direction of the rotor before and after it is attached so as not to generate a pressurizing force. A central annular portion 13-a of the elastic flat plate 13 is fixed to the disc 16 by the screws 12 together with the pressurizing spring 7, and outer peripheral ends 13-b thereof are fixed to one end face 24-a of the intermediate ring 25 by screws 14. Thus, the elastic flat plate 13 receives only a rotation torque generated between the output shaft 15 and the rotor 6. A spacer 17 is inserted to adjust the heights of the pressurizing spring 7 and the elastic flat plate 13. The spacer 17 having a proper thickness is inserted, so that the pressurizing force has a proper value or the elastic flat plate 13 is not deformed in the pressurizing direction. In FIG. 1, the spacer is inserted only between the elastic flat plate 13 and the disc 16. However, in order to achieve the above object, another spacer may be inserted between the pressurizing spring 7 and the elastic flat plate 13.

In the motor with the above-mentioned arrangement, when an electrical signal having a phase difference is supplied from a known driving circuit (not shown) to the piezo-electric element 2, a travelling vibration wave circulating on the elastic body 1 is generated on the elastic body 1 according to the known principle. Thus, the rotor 6, which receives the vibration wave, is rotated together with the output shaft, and a driving force for driving a load (not shown) is output from the output shaft.

In this motor, the bent portions 7-c projecting from the plane connecting the two fixed portions are provided to the pressurizing spring 7 constituting a rotor elastic support member, and as a result, an elastic deformation in a direction connecting the two fixed ends is allowed.

Therefore, an elastic displacement larger than that in the prior art can be attained in a direction to bring a movable body (rotor) and a vibrating body (stator) into tight contact with each other. Even when a dimensional precision error or an assembling error in the constituent members is present, such errors can be absorbed and the pressurizing nonuniformity can be decreased, and deterioration of motor characteristics due to a change in dimension over time of the members can be prevented.

Even when the dimensions of the two end fixed portions of the support member change due to a change in environmental temperature or a temperature gradient among the members, and the dimensions of the beams change in their longitudinal direction, these changes can be absorbed by elastic deformations of the bent portions provided to the beams. Therefore, no partial force is generated in the pressurizing direction, and stable motor characteristics despite a change in environment can be obtained.

Alternative Embodiment

Figure 5:
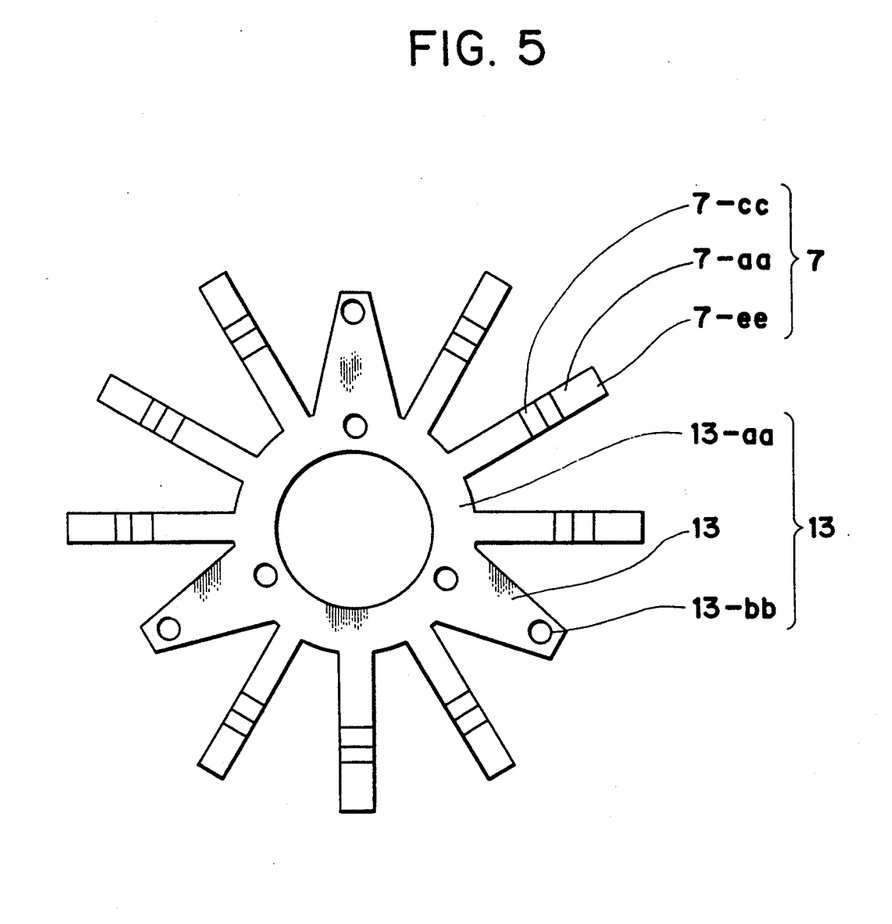
FIG. 5 is a plan view of a member obtained by integrating the pressurizing spring and the elastic flat plate.
Figure 6:
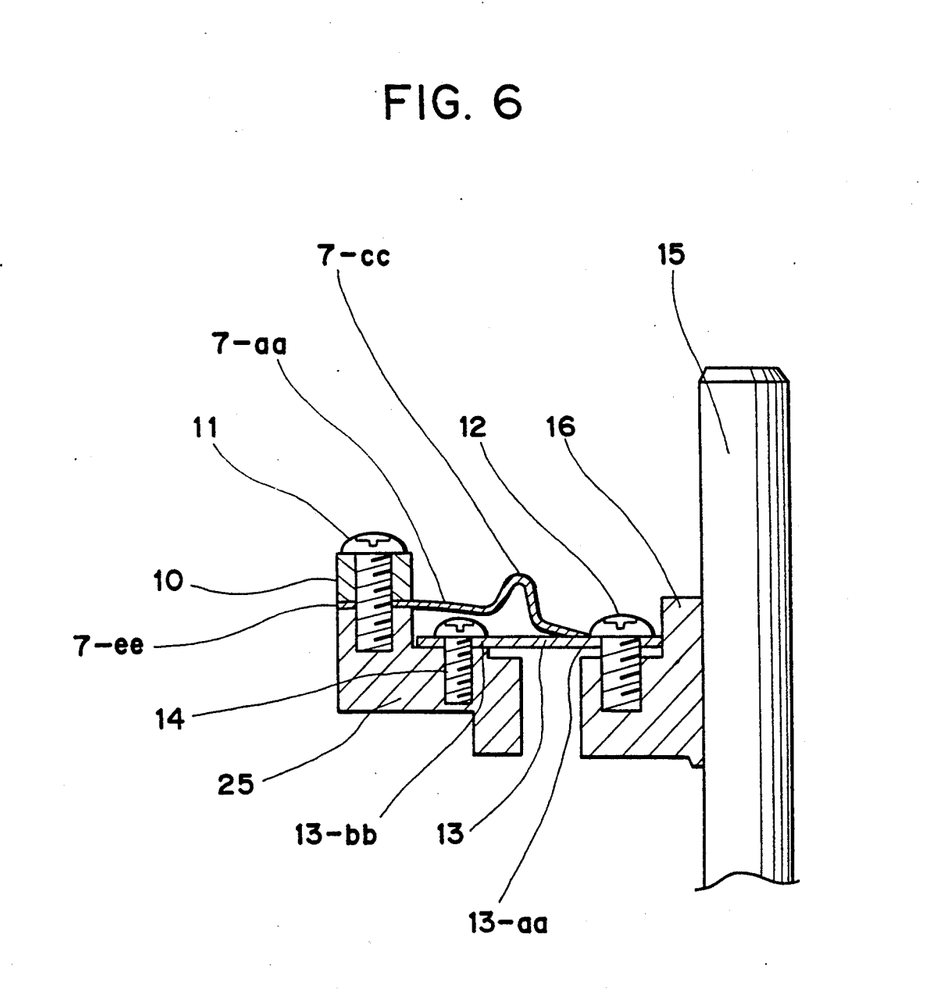
FIG. 6 is a partial sectional view showing a case wherein a motor is attached to the member shown in FIG. 5.

FIGS. 5 and 6 show another embodiment of the present invention. FIG. 5 is a plan view of an elastic support member obtained by integrally forming the above-mentioned pressurizing spring 7 and the elastic flat plate 13, and FIG. 6 is a sectional view showing a principal part of a state wherein the elastic support member is attached to a motor. The pressurizing spring 7 and the elastic flat plate 13 which receives the rotation torque are integrally formed on a central annular portion 13-aa, and outer peripheral ends 7-ee of beams 7-aa are fixed to an intermediate ring 25 by screws 11 together with a fixing ring member 10 like in the first embodiment. Each beam 7-aa has a bent portion 7-cc between the two fixed portions. The elastic flat plate 13 is fixed to the intermediate ring 25 by screws 14. The support member is elastically deformed to a state shown in FIG. 6 after assembling, and operates in the same manner as in the first embodiment.

In the above embodiments, when the gap between an outer surface 25c of a projection portion 25a of the intermediate ring 25 and an inner surface 4a of the rotor main body 4 is as small as about 10 $\mu$m to 20 $\mu$m, these surfaces can contact each other due to an assembling error or a change in dimension over time. As a result, the following problems are posed:

1) The movable body excited upon vibration of the vibrating body collides against a support body, thus generating noise (metal portion).

2) A fretting wear occurs at a contact portion between the excited movable body and the support body, and a fine wear powder is generated. The wear powder enters a sliding surface between the movable body and the vibrating body to cause degradation in performance or abnormal wear of the sliding surface.

In the above embodiments, the gap between the outer surface of the projection portion 25a and the inner surface 4a of the rotor main body 4 is set large enough not to pose these problems.

Figure 11A:
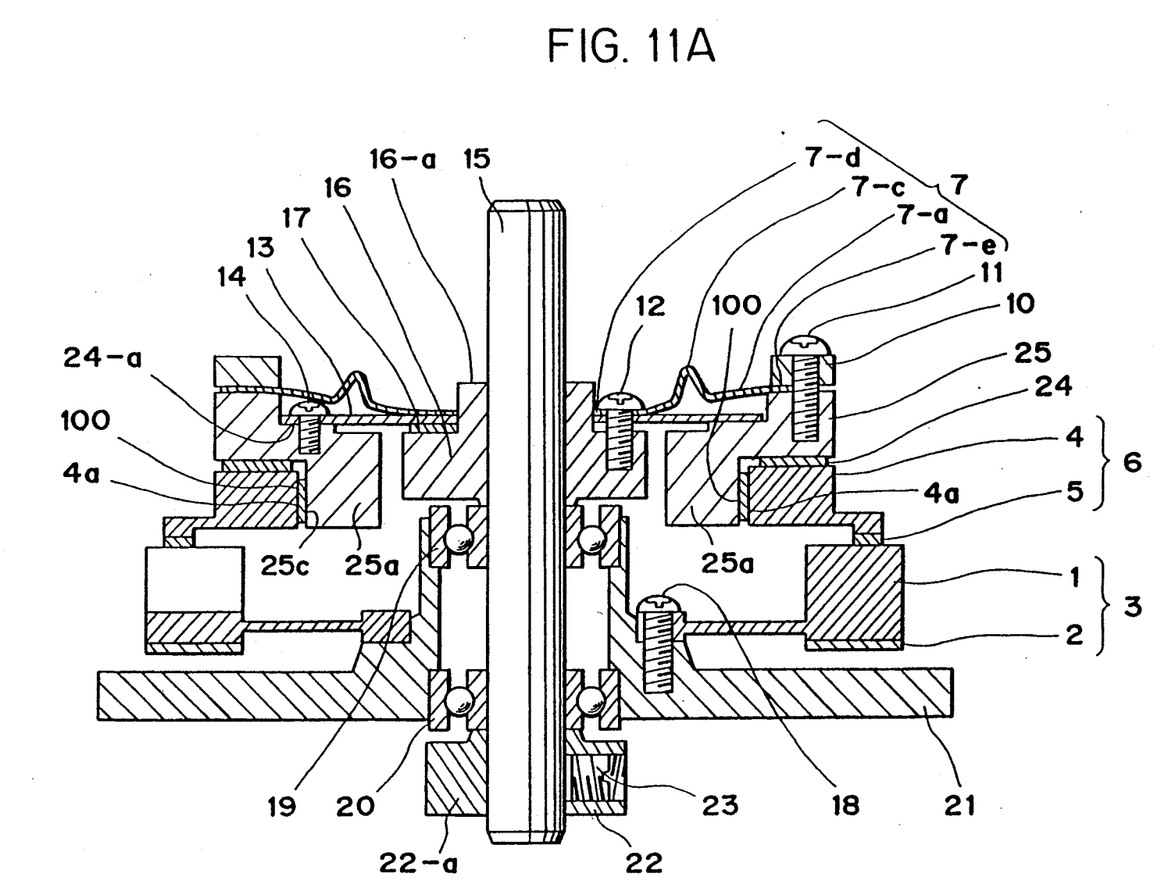
FIG. 11A and 11B are a longitudinal sectional views of alternative embodiments of the present invention.

In still another embodiment of the present invention shown in FIG. 11, a rubber ring 100 is sandwiched between an outer surface 25c of an intermediate ring 25 and an inner surface 4a of a rotor main body 4, thereby preventing a contact between the rotor main body 4 and the intermediate ring 25. Thus, the above-mentioned problems are solved.

Figure 11B:
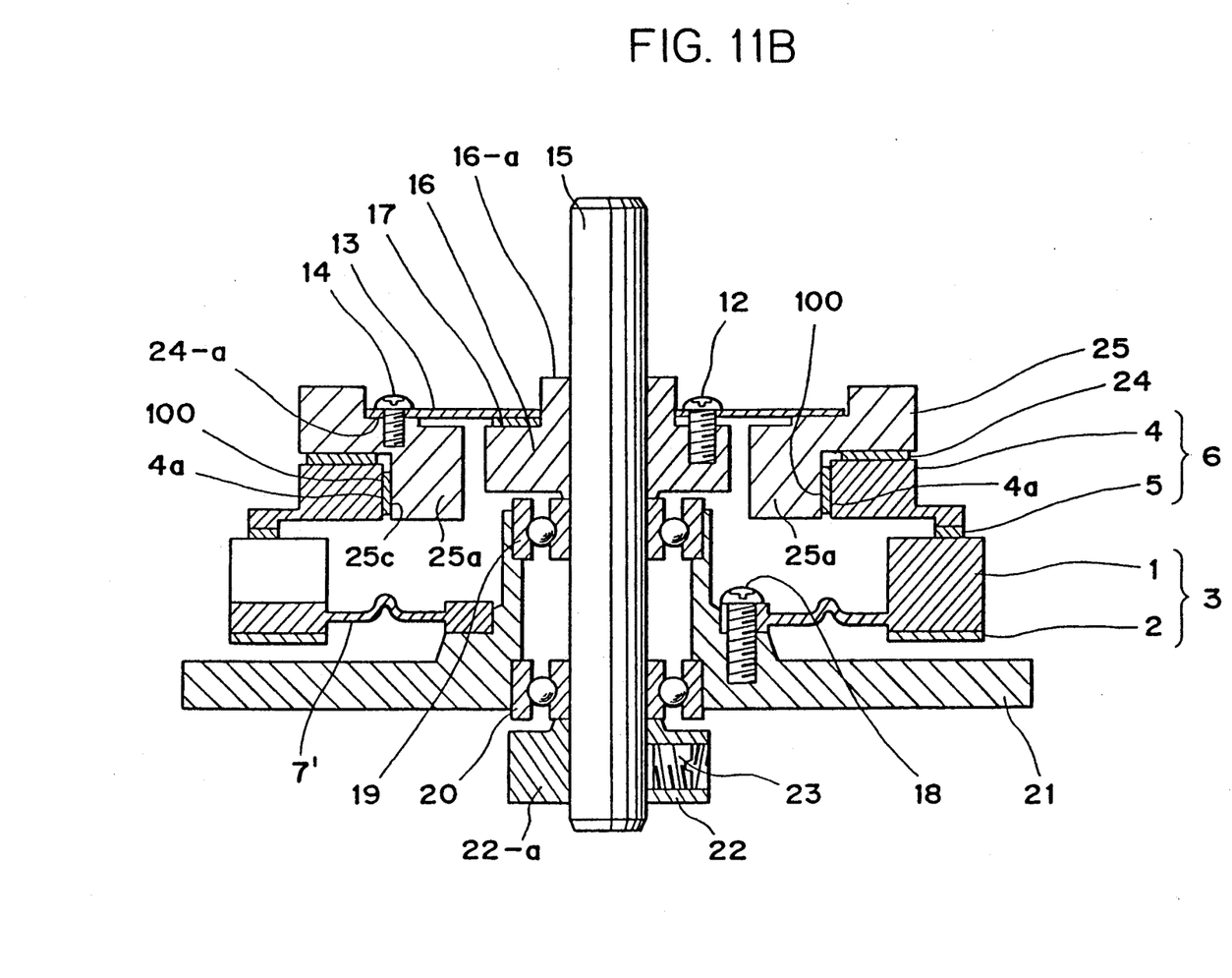
Figure 12:
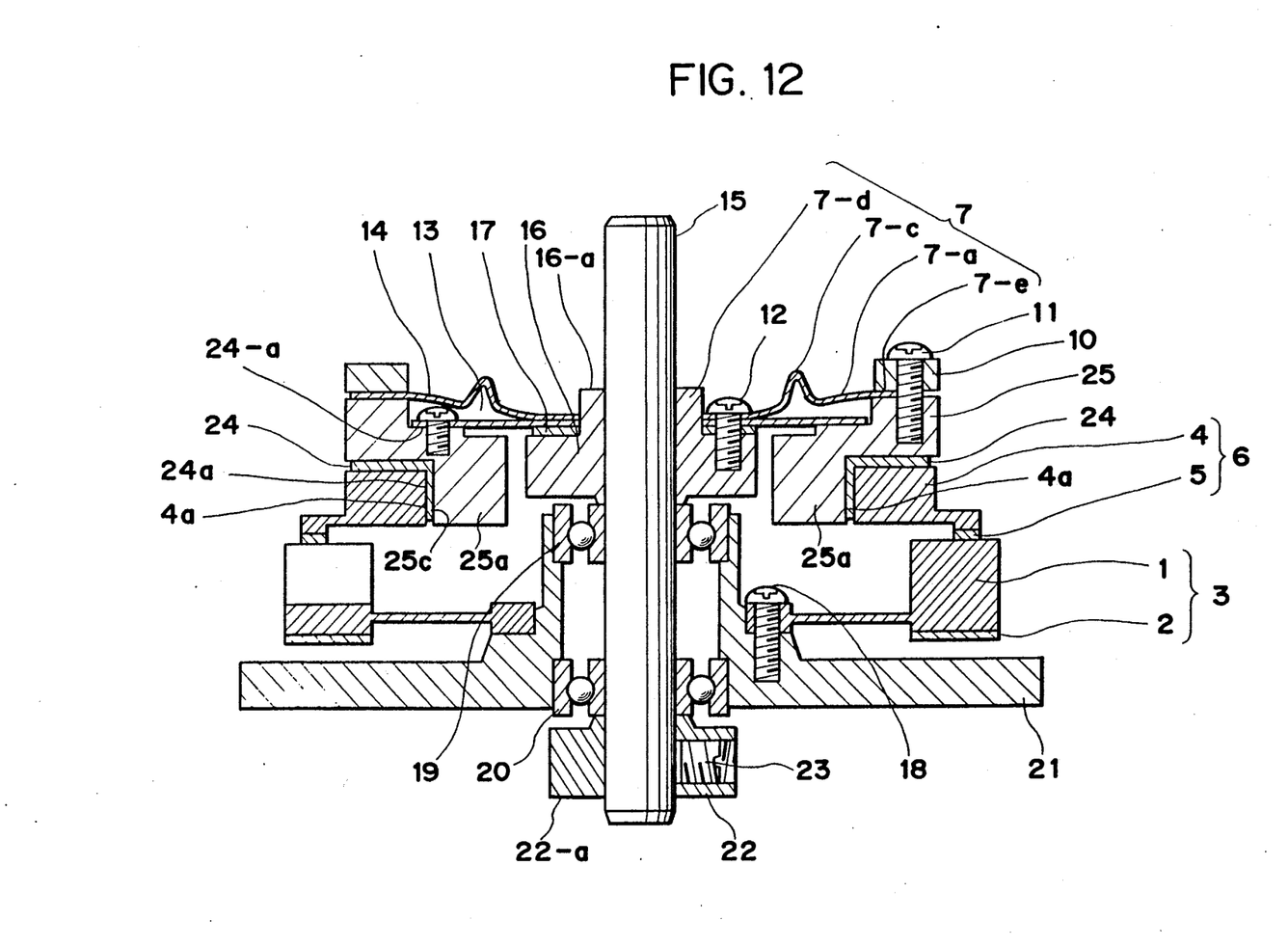
FIG. 12 is a longitudinal sectional view of still another embodiment of the present invention.

In FIG. 12, a depending portion 24a is formed on a rubber body 24 shown in FIG. 1 in place of sandwiching the rubber ring 100 shown in FIG. 11 between the above-mentioned portions, and the depending portion 24a is inserted in the above-mentioned gap to obtain the same effect as in FIG. 11.

In the embodiments shown in FIGS. 11 and 12, a noise prevention effect superior to that of the embodiment shown in FIG. 1 can be provided by an attenuation effect of the rubber ring 100 or the depending portion 24a (FIG. 12) inserted in the gap.

In the embodiments shown in FIGS. 11 and 12, a rubber member is inserted in the gap. However, the same effect as described above may be obtained by applying an elastic paint to one or both of the fitting surfaces of the intermediate ring 25 and the rotor main body 4.

In the embodiment of FIG. 12, a beam-like elastic support member is used as a support member for a rotor as a driven body. Alternatively as shown in FIG. 11B, the beam-like elastic support member according to the present invention may be used as a support member 71 for the vibrating body 3, and the same effect as in the rotor can be provided.

The present invention can also be applied to a vibration driven motor in which a driven body is fixed, and a vibrating body is moved.

As described above, according to the present invention, a bent portion is provided between two fixed portions of each beam of a beam-like elastic support member as a pressurizing means. Thus, even when the two ends of each beam are fixed, and are restrained in the radial direction, the bent portion can be elastically deformed in the longitudinal directional of the beam. Therefore, an elastic displacement larger than that in the prior art can be attained in a direction to bring the movable body and the vibrating body into tight contact with each other. As a result, a dimensional precision error or an assembling error in the constituent members can be absorbed and the pressurizing nonuniformity can be decreased, and deterioration of motor characteristics due to a change in dimension over time can be prevented. Even when the dimensions of the two end fixed portions of the support member change due to a change in environmental temperature or a temperature gradient among the members, and the dimensions of the beams change in their longitudinal direction, such changes can be absorbed by the elastic deformations of the bent portions provided to the beams. Thus, no partial force is generated in the pressurizing direction, and stable motor characteristics against a change in environment can be obtained.

Alteratively, the bent portions provided to absorb a radial change in dimension of the support member may be twisted by a rotation torque, and undesirably decrease torsional rigidity. However, according to one embodiment, since the elastic flat plate, which is arranged not to displace in the pressurizing direction, receives the rotation torque, the torsional rigidity can be simultaneously improved.

Furthermore, since the above-mentioned arrangement according to another embodiment is employed, noise upon rotation of the motor can be eliminated.

What is claimed is:

1. A vibration driven motor, comprising:
    a ring-shaped vibrating member having a surface portion, and generating a travelling vibration wave therein;
    a ring-shaped rotor having a surface portion in frictional contact with the surface portion of said vibrating member, said rotor being rotated by said travelling vibration wave;
    a rotary axle for outputting a rotary force;
    a ring-shaped connection member having a first end portion engaging said rotor, and a second end portion functionally engaging said axle, said connection member having a bent portion that is deformed in an axial direction of said axle at a portion between said first and second portions; and
    an elastic flat plate provided between said rotor and said axle for receiving a rotating torque generated between said rotor and said axle.

2. A vibration driven motor according to claim 1, further comprising an intermediate engaging said axle, said second end portion engaging said intermediate member.

3. A vibration driven motor according to claim 2, wherein an end portion of said elastic flat plate engages said intermediate member.

4. A vibration driven motor according to claim 3, wherein said connection member comprises a plurality of beams disposed in a radial pattern, each having a first end portion, a second end portion and a bent portion.

5. A vibration driven motor, comprising:
    a ring-shaped vibrating member having a surface portion and generating a travelling vibration therein:
    a ring-shaped rotor having a surface portion in frictional contact with the surface portion of said vibrating member, said rotor being rotated by said travelling vibration wave;
    a rotary axle for outputting a rotary force;
    a ring-shaped connection member having a first end portion engaging said rotor, and a second end portion functionally engaging said axle, said connection member having a bent portion that is deformed in a direction crossing the radial direction of said rotor at a portion between said first and second end portions; and
    an elastic flat plate provided between said rotor and said axle for receiving a rotating torque generated between said rotor and said axle.

6. A vibration driven motor according to claim 5, further comprising an intermediate member engaging said axle, said second end portion engaging said intermediate member.

7. A vibration driven motor, comprising:

a vibration member for generating a vibration therein;

a rotor arranged in frictional contact with said vibration member, and rotated by said vibration;

a rotary output member; and a connection member connecting said rotor with said rotary output member, said connection member having a first end portion engaging said rotor, a second end portion functionally engaging said output member, and a bent portion which projects out of a plane defined by connecting said first and second end portions.

8. A vibration driven motor according to claim 7, wherein said vibrating member generates a travelling vibration wave therein in response to electrical signals applied thereto.

9. A vibration driven motor according to claim 8, wherein said vibrating member comprises a ring-shaped elastic element.

10. A vibration driven motor, comprising:
a vibrating member for generating a vibration therein;
a rotor arranged in frictional contact with said vibrating member, and rotated by said vibration;
a rotary output member for transmitting a rotational force of said rotor to a load; and
a connection member engaging said vibration member at a predetermined portion, said connection member having a bent portion deformed in an axial direction of said rotary output member.

11. A vibration driven motor, comprising:
a vibration member for generating a vibration therein;
a rotor arranged in frictional contact with said vibration member, and rotated by said vibration;
a rotary output member; and
a connection member connecting said rotor with said rotary output member, said connection member having a first portion engaging said rotor, a second portion functionally engaging said output member, and a bent portion which projects out of a plane defined by connecting said first and second portions.

12. A vibration driven motor, comprising:
a vibration member for generating a vibration therein:
a contact member arranged in frictional contact with said vibrating member, for receiving said vibration, said vibration causing relative movement between said vibration member and said contact member;
an output member connected with one of said vibration member and said contact member, for transmitting a driving force to a load; and
a connection member connecting said contact member with said output member, said connection member having a first portion engaging said contact member, a second portion functionally engaging said output member, and a bent portion which projects out of a plane defined by connecting said fist and second portions.

13. A vibration driven motor according to claim 12, wherein said vibrating member generates a travelling vibration wave therein in response to electrical signals applied thereto.

14. A vibration driven motor, comprising:
a vibration member for generating a vibration therein;
a contact member arranged in friction contact with said vibrating member, for receiving said vibration, said vibration causing relative movement between said vibration member and said contact member;
an output member connected with one of said vibration member and aid contact member, for transmitting a driving force to a load; and
a connection member engaging said vibration member at a predetermined portion, said connection member having a bent portion deformed in an axial direction of said output member.

* * * * *

UNITED STATES PATENT AND TRADEMARK OFFICE
CERTIFICATE OF CORRECTION

PATENT NO. : 5,313,132
DATED : May 17, 1994
INVENTOR(S) : NAKANISHI

It is certified that error appears in the above-indentified patent and that said Letters Patent is hereby corrected as shown below:

At [57] Abstract

Line 7, change "on to --of--

Column 3

Line 1, change "FIG." to --FIGS.--; and change "are a" to --are--.

Column 5

Line 37, change "Alternatively" to --Alternatively,--.
Line 39, change "member 71" to --member $7^1$--.
Line 52, change "directional" to --direction--.

Column 6

Line 3, change "Alteratively," to --Alternatively,--
Line 35, change "intermediate" to --intermediate member--

UNITED STATES PATENT AND TRADEMARK OFFICE
CERTIFICATE OF CORRECTION

PATENT NO. : 5,313,132
DATED : May 17, 1994
INVENTOR(S) : NAKANISHI

It is certified that error appears in the above-indentified patent and that said Letters Patent is hereby corrected as shown below:

<u>Column 7</u>

Line 4, change "tion member to --ting member--.

<u>Column 8</u>

Line 20, change "fist" to --first--.
Line 28, change "friction" to --frictional--.
Line 33, change "aid" to --said--.

Signed and Sealed this

Twenty-fifth Day of October, 1994

Attest:

BRUCE LEHMAN

Attesting Officer

Commissioner of Patents and Trademarks